United States Patent
Itoh

(10) Patent No.: US 6,866,339 B2
(45) Date of Patent: Mar. 15, 2005

(54) HEAD REST APPARATUS

(75) Inventor: Keishirou Itoh, Yokohama (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 09/985,769

(22) Filed: Nov. 6, 2001

(65) Prior Publication Data

US 2002/0053819 A1 May 9, 2002

(30) Foreign Application Priority Data

Nov. 8, 2000 (JP) .......................................... 2000-339833

(51) Int. Cl.$^7$ .......................... B60R 21/055; B60N 2/42
(52) U.S. Cl. .............................. 297/261.12; 297/216.14; 297/408
(58) Field of Search ....................... 297/216.12, 216.13, 297/216.14, 408, 452.2

(56) References Cited

U.S. PATENT DOCUMENTS

| | | | | |
|---|---|---|---|---|
| 2,973,029 A | * | 2/1961 | Schlosstein | ............ 297/216.12 |
| 3,802,737 A | * | 4/1974 | Mertens | .................... 297/216.2 |
| 5,378,043 A | * | 1/1995 | Viano et al. | ................ 297/406 |
| 5,795,019 A | * | 8/1998 | Wieclawski | ............ 297/216.12 |
| 5,884,968 A | * | 3/1999 | Massara | ................ 297/216.12 |
| 5,927,804 A | * | 7/1999 | Cuevas | ................... 297/216.12 |
| 6,199,947 B1 | * | 3/2001 | Wiklund | ................ 297/216.12 |
| 6,250,714 B1 | * | 6/2001 | Nakano et al. | ......... 297/216.12 |

FOREIGN PATENT DOCUMENTS

| | | |
|---|---|---|
| EP | 0 627 340 A1 | 12/1994 |
| EP | 1 026 029 A2 | 8/2000 |
| EP | 1 203 692 A2 | 10/2001 |
| GB | 2 318 045 A | 4/1998 |
| JP | 10-169486 | 6/1998 |
| JP | 2000-201770 A * | 7/2000 |
| JP | 2000-217660 A * | 8/2000 |
| JP | 2001-39194 A * | 2/2001 |
| WO | WO 98/09838 | 3/1998 |

OTHER PUBLICATIONS

European Search Report EP 01 12 6310, Feb. 19, 2002 and EP 1 026 029 A3, Aug. 9, 2000.

* cited by examiner

*Primary Examiner*—Peter M. Cuomo
*Assistant Examiner*—Joseph Edell
(74) *Attorney, Agent, or Firm*—Arent Fox PLLC

(57) ABSTRACT

The invention provides a head rest apparatus provided with a head rest frame supported to a seat back frame of a seat back via a tilting shaft so as to freely tilt and having an upper side of the tilting shaft to which a head rest is attached, a pressure receiving member provided in a lower side of the tilting shaft in the head rest frame and receiving a load applied from a front surface of the seat back to a backward portion, and an urging member engaging with the seat back frame and the head rest frame and always urging the head rest frame in a backward tilting direction, in which the head rest frame forward tilts around the tilting shaft corresponding to a supporting point and the head rest forward moving when the pressure receiving member is exposed to the load. The urging member is structured such as to urge the head rest frame in the backward tilting direction from a rear portion.

4 Claims, 4 Drawing Sheets

HEAD REST APPARATUS

BACKGROUND OF THE INVENTION

1. Field of the Invention

The present invention relates to a head rest apparatus provided in a seat back in a seat for automobiles and reducing a whiplash syndrome applied to a passenger at a time of being collided from rear-end or the like.

2. Background Art

FIG. 4 shows an inner structure of a reclining type seat back provided with a conventional head rest apparatus 30. In FIG. 4, reference numeral 21 denotes a seat back frame formed in a substantially reverse-U shape as seen from a front face. The seat back frame 21 is mounted to a seat cushion (not shown) via a reclining shaft 22 provided in a lower end so as to freely tilt. The head rest apparatus 30 is provided in upper end portions of right and left vertically extending portions of the seat back frame 21 via brackets 23.

The apparatus 30 is mainly constituted by a C-shaped head rest frame 31 mounted to each of the brackets 23 via a tilting shaft so as to freely tilt in a longitudinal direction, a pressure receiving plate 32 fixed to a lower end portion of the head rest frame 31, and coil springs 33 always urging the head rest frame 31 in a backward tilting direction. Head rest holders 34 to which stays of a head rest (not shown) are attached are mounted to upper end portions of the head rest frame 31. The coil springs 33 are provided between the seat back frame 21 and end portions of the pressure receiving plate 32, and pull the pressure receiving plate 32 forward, thereby always urging the head rest frame 31 in a backward tilting direction. With respect to an attaching aspect of the coil springs 33, as shown in FIG. 6, there is a case of being connected to the pressure receiving plate 32 from the seat back frame 21 via links 35. The head rest holders 34 are brought into contact with the upper end portion of the seat back frame 21, whereby the head rest frame 31 is restricted from being backward tilted more over, and is held at a fixed position.

In accordance with the head rest apparatus 30 mentioned above, when a passenger sitting on the seat relatively moves backward due to a reaction of a shocking forward acceleration of an automobide caused by a rear-end collision or the like, the pressure receiving plate 32 is backward pressed against the urging force of the coil springs 33. Following to this motion, the head rest frame 31 tilts forward around the tilting shaft corresponding to a supporting point, and the head rest moves forward so as to support a head portion of the passenger. FIG. 7 shows a state in which a human body M of the passenger moves backward and the head rest 36 moves forward. As mentioned above, the head rest positively moves forward so as to support the head portion of the passenger, whereby a whiplash syndrome applied to the passenger is reduced.

In the conventional head rest apparatus 30 mentioned above, the coil springs 33 urging the head rest frame 31 in the backward tilting direction has a layout for pulling the pressure receiving plate 32 from the forward. Accordingly, as shown in FIG. 8, the human body M of the passenger pressing the cushion 24 of the seat back and moving backward is easily interfered with the coil springs 33, and there is a case that the coil springs 33 are interfered with the seat back frame 31, so that there is a risk that the head rest apparatus 30 does not reliably operate. Further, since it is impossible to secure a sufficient distance (denoted by reference symbol L) from the coil spring 33 to the surface of the cushion 24, it is necessary to form a pad member such as an urethane foam or the like constituting the cushion 24 thin, however, this formation requires a difficulty. Further, there is a requirement of reducing a thickness and a width of the seat back according to some sizes of the automobile and some layouts of the seat, and in this case, it is difficult to provide with the head rest apparatus 30 using the coil springs 33 mentioned above in the seat.

SUMMARY OF THE INVENTION

Accordingly, an object of the present invention is to provide a head rest apparatus which can ensure a reliable operation without a human body of a passenger being interfered with an urging member for urging a head rest frame in a backward tilting direction and can be provided even in the case that a size, a thickness or the like of a seat back is restricted.

In accordance with the present invention, there is provided a head rest apparatus comprising: a head rest frame supported to a seat back frame of a seat back via a tilting shaft so as to freely tilt, and having an upper side of the tilting shaft, to which a head rest is attached; a pressure receiving member provided in a lower side of the tilting shaft in the head rest frame and receiving a load applied from a front surface of the seat back to a backward portion; an urging member engaging with the seat back frame and the head rest frame and always urging the head rest frame in a backward tilting direction; and the head rest frame forward tilting around the tilting shaft corresponding to a supporting point and the head rest forward moving when the pressure receiving member is exposed to the load, wherein the urging member urges the head rest frame in the backward tilting direction from a rear portion.

In accordance with the present invention, the urging member always urging the head rest frame in the backward tilting direction is arranged so as to backward tilt the head rest from the rear portion. That is, the urging member is arranged at the back of the head rest frame, whereby it is possible to prevent the urging member from protruding forward and to an outer side in a width direction from the seat back frame. Accordingly, a reliable operation can be ensured without the human body of the passenger being interfered with the urging member, and even in the case that the size, the thickness or the like of the seat back is restricted, the head rest apparatus can be equipped.

The urging member in accordance with the present invention can employ any structure as far as it can engage with the seat back frame and the head rest frame and can urge the head rest frame in the backward tilting direction from the rear portion, however, a cantilever or a leaf spring is preferably employed.

DETAILED EXPLANATION OF THE INVENTION

A description will be given of an embodiment in accordance with the present invention with reference to the accompanying drawings.

Figure 1:
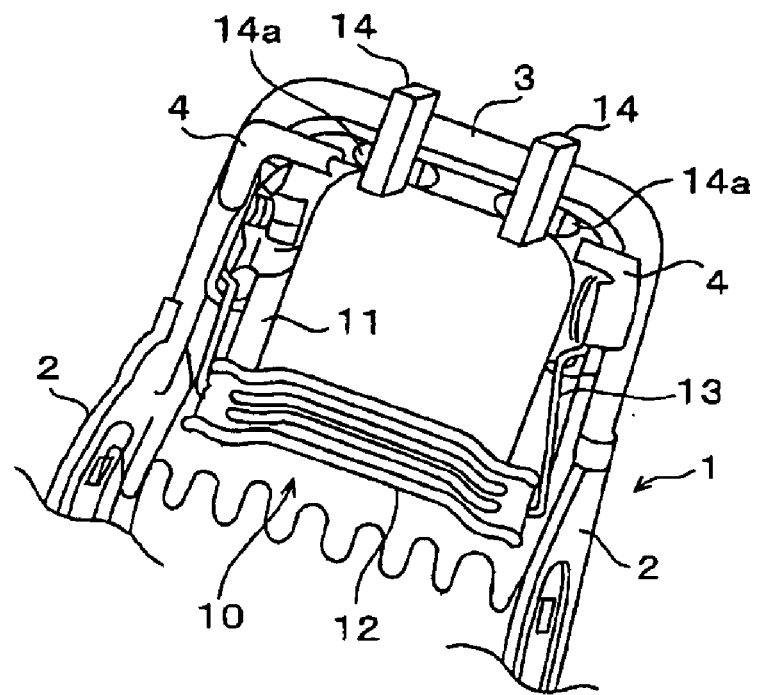
FIG. 1 is a perspective view showing a part of an inner structure of a seat back provided with a head rest apparatus in accordance with an embodiment of the present invention.

FIG. 1 shows a part of an inner structure of a seat back provided with a head rest apparatus 10 in accordance with an embodiment. In FIG. 1, reference numeral 1 denotes a seat back frame formed in a substantially reverse-U shape as seen from a front face. The seat back frame 1 is structured such that both ends of a C-shaped upper frame 3 are respectively fixed to upper ends of a pair of right and left side frames 2, and is mounted to a seat cushion via a reclining apparatus (not shown) provided between lower ends of the respective side frames 2 so as to freely tilt. The head rest apparatus 10 is provided in upper end portions of right and left portions extending in a vertical direction of the upper frame 3 via brackets 4.

The head rest apparatus 10 is mainly constituted by a C-shaped head rest frame 11 mounted to the respective brackets 4 via tilting shafts 13d so as to freely tilt in a longitudinal direction, a pressure receiving plate (a pressure receiving member) 12 fixed to a lower end portion of the head rest frame 11, and a cantilever 12 (an urging member) 13 always urging the head rest frame 11 in a backward tilting direction. The head rest frame 11 is arranged in a state of being received in an inner portion of the upper frame 3 so as to direct both ends downward, and portions a suitable distance below the upper ends of the right and left portions extending in the vertical direction are mounted to the brackets 4 via the tilting shafts 13d.

A laterally extending upper end portion of the head rest frame 11 is positioned at the upper side of the tilting shaft, and a pair of right and left head rest holders 14 to which head rest stays (not shown) are attached are mounted to the upper end portion by metal fittings 14a. On the contrary, lower end portions of the vertically extending right and left portions of the head rest frame 11 are positioned below the tilting shaft, and the pressure receiving plate 12 is provided so as to extend between front surface sides of the lower end portions and is fixed thereto.

Figure 2:
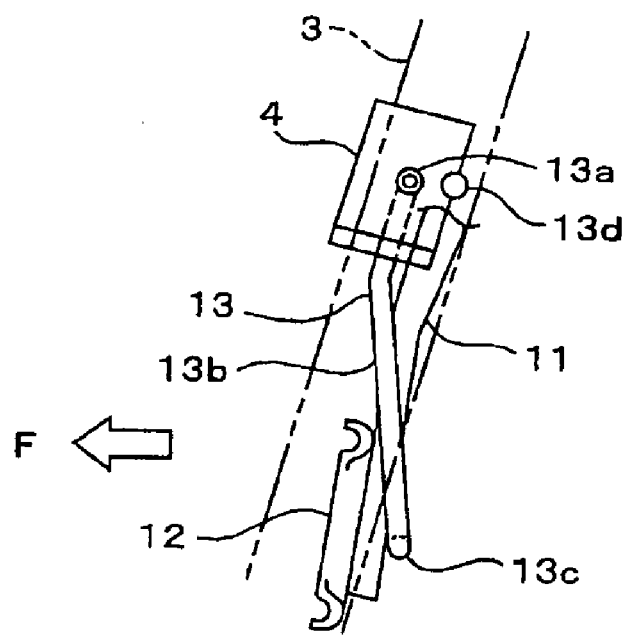
FIG. 2 is a side elevational view of the head rest apparatus in accordance with the embodiment of the present invention.
Figure 3:
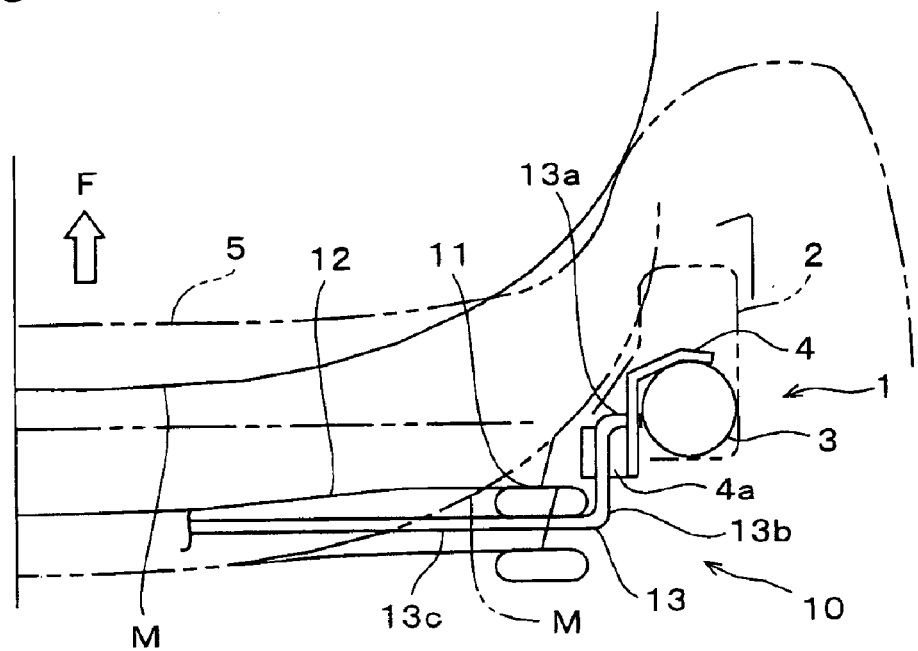
FIG. 3 is a partly horizontal cross sectional view of the seat back for describing an operation of the head rest apparatus in accordance with the embodiment of the present invention.
Figure 4:
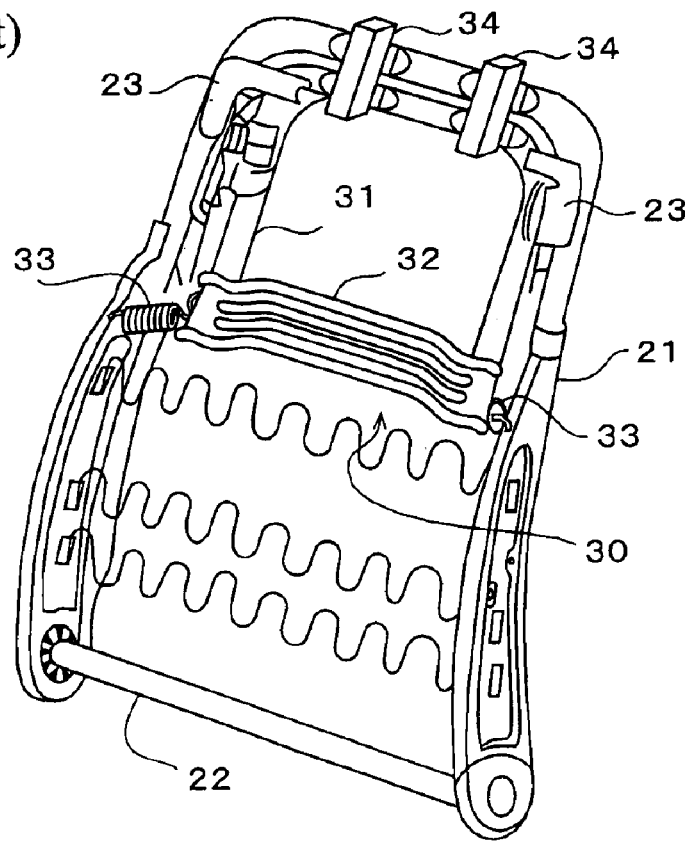
FIG. 4 is a perspective view showing an inner structure of a seat back provided with a conventional head rest apparatus.
Figure 5:
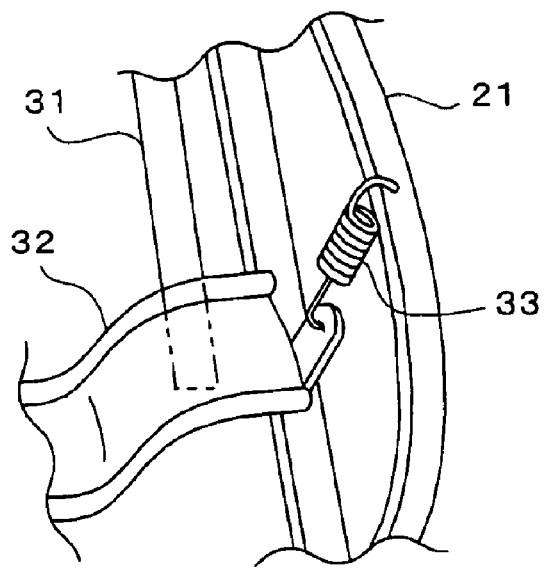
FIG. 5 is a perspective view showing a mounting structure of an urging member provided in the conventional head rest apparatus.
Figure 6:
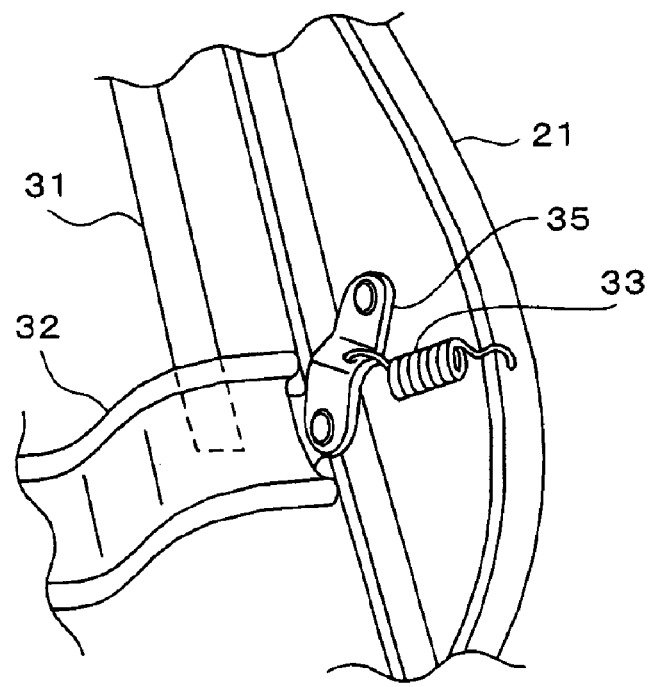
FIG. 6 is a perspective view showing another aspect of the mounting structure of the conventional head rest apparatus.
Figure 7:
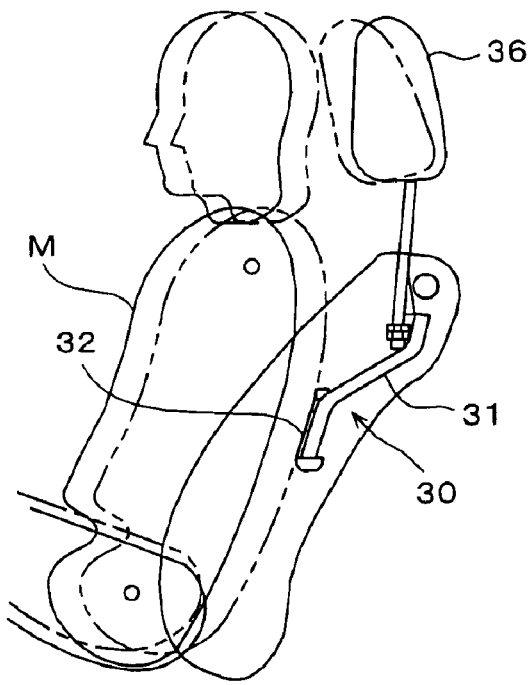
FIG. 7 is a side elevational view schematically showing an operation of the conventional head rest apparatus.
Figure 8:
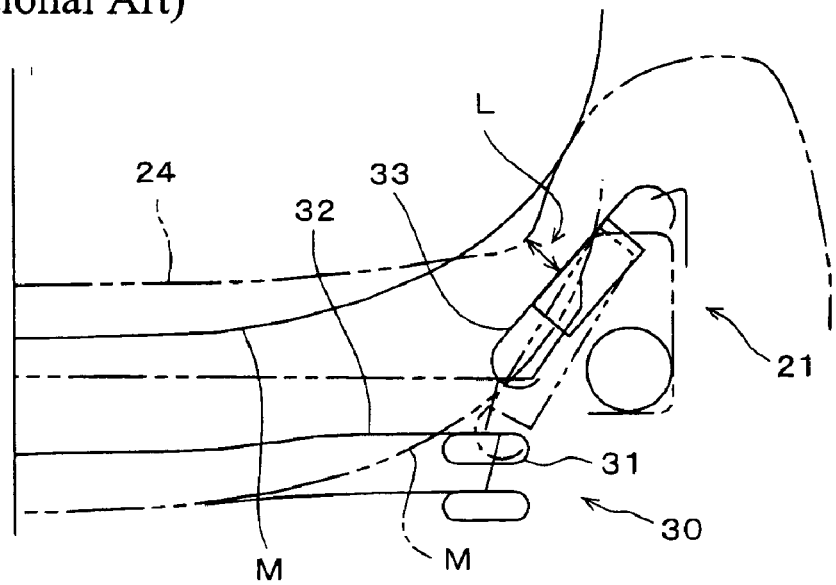
FIG. 8 is a partly horizontal cross sectional view of the seat back for describing an operation of the conventional head rest apparatus.

The cantilever 13 is structured such that a round rod having an elasticity is bent in a substantially C shape, and in a state of directing an open side thereof upward, as shown in FIGS. 2 and 3, shaft portions 13a formed in both end portions and protruding outward are rotatably attached to the respective brackets 4. The cantilever 13 has, as shown in FIGS. 2 and 3, right and left vertical rod portions 13b extending downward from the shaft portions 13a and bent at a middle portion thereof, and a horizontal rod portion 13c connecting lower ends of the vertical rod portions 13b and extending in a lateral direction. Further, the vertical rod portions 13b extend in a vertical direction in an outer side of the head rest frame 11, and the horizontal rod portion 13c is arranged in a back surface side of the lower end portion of the head rest frame 11. In this case, in order to make the cantilever 13 in a cantilever support structure, it is possible to employ an optional structure such as engaging a stopper 4a fixed to the bracket 4 with a lower side of the shaft portion 13a as shown in FIG. 3 or the like. In this case, reference numeral 5 in FIG. 3 denotes a cushion made of a pad material such as an urethane foam or the like.

The cantilever 13 arranged in the manner mentioned above is structured such as to elastically return to a front portion shown by an arrow F in FIGS. 2 and 3 due to an elasticity of the vertical rod portions 13b, whereby the horizontal rod portion 13c urges the lower end portion of the head rest frame 11 forward. That is, the head rest frame 11 is always urged in a backward tilting direction by the cantilever 13, and the pressure receiving plate 12 is always urged forward. The head rest holder 14 is brought into contact with the upper end portion of the upper frame 3, whereby the head rest frame 11 is prevented from backward tilting any more and is kept at a fixed position.

In accordance with the head rest apparatus 10 mentioned above, when the passenger sitting on the seat relatively moves backward due to a reaction generated in accordance that the automobile car is accelerated forward in a shocking manner due to a rear-end collision or the like, the pressure receiving plate 12 is backward pressed against the urging force of the cantilever 13. Following to this motion, the head rest frame 11 forward tilts around the tilting shaft corresponding to a supporting point and the head rest moves forward so as to support the head portion of the passenger. As mentioned above, since the head rest positively moves forward so as to support the head portion of the passenger, a whiplash syndrome applied to the passenger can be reduced.

In accordance with the present embodiment, the cantilever 13 always urging the head rest frame 11 in the backward tilting direction is arranged so as to tilt backward the head rest frame 11 from the rear portion. That is, as is apparent from FIG. 3, the cantilever 13 is arranged at the back of the head rest frame 11, whereby the cantilever 13 is prevented from protruding forward and to the outer side in the width direction from the seat back frame 1. Accordingly, the human body M of the passenger is not interfered with the cantilever 13 and a reliable operation can be ensured. Further, even in the case that the size, the thickness or the like of the seat back is restricted, the cantilever 13 does not protrude from the seat back frame 1, so that it is possible to ensure the thickness of the cushion and the head rest apparatus 10 can be equipped.

The cantilever 13 in accordance with the embodiment mentioned above corresponds to one particular example of the urging member in accordance with the present invention, and the urging member in accordance with the present invention is not limited to the cantilever 13 mentioned above. The urging member in accordance with the present invention can employ any structure as far as it engages with the seat back frame 1 and the head rest frame 11 and can urge the head rest frame 11 in the backward tilting direction from the rear portion, and for example, a leaf spring or the like can be suitably employed.

What is claimed is:

1. A head rest apparatus comprising:
    a head rest frame supported on a seat back frame of a seat back via a tilting shaft so as to freely tilt, and having an upper side of the tilting shaft, to which a head rest is attached;
    a pressure receiving member provided in a lower side of the tilting shaft in the head rest frame and receiving a load applied from a front surface of the seat back to a backward portion;

an urging member engaging with the seat back frame and the head rest frame and always urging the head rest frame in a backward tilting direction; and a stopper member for restricting backward tilting of the head rest frame;

wherein the head rest frame tilts forward around the tilting shaft so as to move the head rest forward when the pressure receiving member is exposed to the load, the urging member thrusts an upper portion of the head rest frame in the backward tilting direction to contact the stopper member by urging a lower rear portion of the head rest frame in a forward direction; and a head rest holder for mounting the head rest thereto is provided at an upper end of the head rest frame, the head rest holder has a rear surface facing backward, and an upper end of the seat back frame has a front surface facing forward, the rear surface is brought into contact with the front surface, whereby back tilting of the head rest frame is restricted.

2. A head rest apparatus comprising:

a head rest frame supported on a seat back frame of a seat back via a tilting shaft so as to freely tilt, and having an upper side of the tilting shaft, to which a head rest is attached;

a pressure receiving member provided in a lower side of the tilting shaft in the head rest frame and receiving a load applied from a front surface of the seat back to a backward portion;

an urging member engaging with the seat back frame and the head rest frame and always urging the head rest frame in a backward tilting direction; and a stopper member for restricting backward tilting of the head rest frame;

wherein the head rest frame tilts forward around the tilting shaft so as to move the head rest forward when the pressure receiving member is exposed to the load, the urging member urges the head rest frame in the backward tilting direction from a rear portion of the head rest frame so as to be thrust to the stopper member, and a head rest holder for mounting the head rest thereto is provided at an upper end of the head rest frame, the head rest holder is brought into contact with an upper end of the seat back frame, whereby back tilting of the head rest frame is restricted, the urging member is a cantilever, a bracket is mounted to an upper end portion of the seat back frame, an upper end of the cantilever is mounted to the bracket.

3. A head rest apparatus according to claim 2, wherein the cantilever is provided with a pair of right and left vertical rod portions and a horizontal rod portion connecting lower ends of the vertical rod portions to each other so as to be formed in a substantially U shape, upper end portions of the vertical rod portions are supported to the seat back frame in a cantilever manner, and the horizontal rod portion urges the head rest frame.

4. A head rest apparatus according to claim 2, wherein a stopper is mounted to the bracket, the upper end of the cantilever is engaged with the stopper so as to form a cantilever support structure.

* * * * *